United States Patent Office 2,920,015
Patented Jan. 5, 1960

2,920,015

LONG-ACTING VITAMIN $B_{12}$

Robert E. Thompson, Momence, Ill., assignor to Armour and Company, Chicago, Ill., a corporation of Illinois No Drawing. Application August 27, 1957
Serial No. 680,635

4 Claims. (Cl. 167—81)

This invention relates to an injectible vitamin $B_{12}$ preparation which, upon parenteral administration, demonstrates an elevated blood vitamin $B_{12}$ level for a significantly prolonged period of time.

Vitamin $B_{12}$ or cobalamin in relatively recent years has found wide-spread use in the treatment of anemic and neurological conditions and in the prophylaxis of potential vitamin $B_{12}$ deficiencies, such as in geriatric practice. In the parenteral administration of massive doses of vitamin $B_{12}$ for these purposes the vitamin is conventionally injected subcutaneously or intramuscularly in the form of an aqueous isotonic saline solution. Thereupon the serum vitamin $B_{12}$ is immediately elevated to a level considerably in excess of the renal threshold for vitamin $B_{12}$, and the vitamin is rapidly excreted in the urine within a period of about 24 hours. Consequently, in order to provide increased availability of vitamin $B_{12}$ to the body tissues in these situations it is currently necessary to administer the vitamin to the patient several times a week.

I have discovered a vitamin $B_{12}$ composition which upon subcutaneous or intramuscular injection provides a significant elevation in the serum vitamin $B_{12}$ level, which elevation can be regulated such that the renal threshold for vitamin $B_{12}$ is not exceeded. Moreover, this elevated serum vitamin $B_{12}$ level can be maintained for a significantly prolonged period of time.

In accordance with this invention, these advantages are provided by a vitamin $B_{12}$ composition which includes a vitamin $B_{12}$-active substance in combination with zinc and tannic acid. It has been found that this composition produces upon subcutaneous or intramuscular injection an elevation in the serum vitamin $B_{12}$ level for a period as long as two weeks in comparison with the approximately 24 hour duration of effect obtained with aqueous vitamin $B_{12}$ preparations.

In the experimentation leading to the present invention, it was observed that the combination of vitamin $B_{12}$ with zinc resulted in a water-soluble complex which upon injection demonstrated results comparable to those obtained with aqueous vitamin $B_{12}$ preparations, i.e., the zinc-vitamin $B_{12}$ preparation was rapidly excreted in the urine within about 24 hours after injection. Also it was found that the combination of tannic acid with vitamin $B_{12}$ resulted in a preparation which upon injection increased the period during which the blood level of vitamin $B_{12}$ was elevated to slightly over 24 hours, but the prolongation of effect was in no way comparable to that obtained with the zinc-vitamin $B_{12}$-tannate composition of this invention. Consequently, the combination of vitamin $B_{12}$ with both zinc and tannic acid results in a composition in which the zinc and tannic acid act synergistically to effect a prolongation of the period during which the serum vitamin $B_{12}$ level is maintained at an elevated level. Although it has not presently been possible to elucidate the mode of action by which this response is obtained, it is believed that the zinc-vitamin $B_{12}$ tannic acid composition, upon subcutaneous or intramuscular administration, forms a depot of vitamin $B_{12}$ at the site of injection from which the vitamin $B_{12}$ is metered into the blood stream at a rate such that the serum vitamin $B_{12}$ is maintained at a level above that which obtained prior to the injection thereof, but below that of the renal threshold, and that this metering effect may be produced under appropriate conditions for a period as long as two weeks.

The term "vitamin $B_{12}$ active substance" conventionally refers to cobalamin or a compound structurally related to cobalamin which promotes growth of a microorganism requiring vitamin $B_{12}$ for nutrition, such as Lactobacillus leichmannii. This class of compounds includes such derivatives of cobalamin as cyanocobalamin and hydroxycobalamin.

The combination of the vitamin $B_{12}$-active substance with zinc and tannic acid results in a complex which is insoluble in water, and which may be provided as an aqueous vitamin $B_{12}$ suspension in accordance with this invention. That is, there is provided according to this invention a water-insoluble complex having as components thereof a vitamin $B_{12}$ active substance, zinc ion and tannic acid. The period of time during which the composition produces an elevation in the serum vitamin $B_{12}$ level, and the extent to which the serum vitamin $B_{12}$ level is elevated during such period, may be controlled by regulating the ratio of either the tannic acid or zinc combined with the vitamin $B_{12}$-active substance in this water-insoluble complex. Furthermore, the amount of the vitamin $B_{12}$-active substance included in this water-insoluble complex will be a determining factor in controlling the period of time during which the serum vitamin $B_{12}$ level is elevated upon injection thereof.

It has been found that about 1 mg. of zinc ion is capable of completely insolubilizing in water 2 mgs. of pure tannic acid, i.e., approximately 2.5 moles of zinc ion per mole of tannic acid is required to provide an insoluble zinc tannate. Also, it has been found that about 2 mgs. of pure tannic acid per mg. of crystallized cabalamin is capable of producing a completely water-insoluble zinc-vitamin $B_{12}$-tannate preparation, i.e., 4.5 moles of tannic acid are required per mole of vitamin $B_{12}$ to obtain a completely water-insoluble zinc-vitamin $B_{12}$-tannate composition. Thus, a completely water-insoluble zinc-vitamin $B_{12}$-tannate may consist of approximately 1 mg. of zinc ion, 2 mgs. of pure tannic acid and 1 mg. of crystallized cobalamin.

In employing ratios of zinc and tannic acid less than would be required to produce a completely water-insoluble zinc-vitamin $B_{12}$-tannate, there will be obtained a preparation in which a portion of the vitamin $B_{12}$ is retained in the water-soluble form and in which such portion of water-soluble vitamin $B_{12}$ behaves upon subcutaneous or intramuscular injection in a manner similar to that of the conventional aqueous isotonic saline solution of vitamin $B_{12}$. Thus, vitamin $B_{12}$ compositions may be obtained in accordance with this invention in which the ratio of zinc and tannic acid to vitamin $B_{12}$ can be regulated to modify the intensity of effect upon injection, as well as the duration of time in which such modified intensity of effect is produced.

Although especially desirable results are achieved with the vitamin $B_{12}$ composition of this invention when there is employed therein a crystalline vitamin $B_{12}$ preparation, the advantages of the invention may be obtained with any vitamin $B_{12}$ preparation suitable for parenteral administration. Also the zinc and tannic acid included in this vitamin $B_{12}$ composition should be suitable for parenteral administration.

In accordance with this invention, the Vitamin $B_{12}$ composition may be obtained by combining with tannic acid and vitamin $B_{12}$ in an aqueous reaction medium a water-soluble zinc salt, such as zinc acetate and zinc chloride, to obtain in the resulting aqueous suspension a water-insoluble zinc-vitamin $B_{12}$-tannate complex. In preparing an injectible composition according to this process, there is formed a sterile aqueous suspension of the water-insoluble zinc-vitamin $B_{12}$-tannate complex in an isotonic saline solution. This injectible preparation is obtained by combining a sterilized aqueous solution of tannic acid with a sterilized aqueous solution of crystalline vitamin $B_{12}$, and thence aseptically combining with such sterile aqueous mixture of vitamin $B_{12}$ and tannic acid a sterilized aqueous solution of the water-soluble zinc salt to obtain a sterile aqueous suspension of the water-insoluble zinc-vitamin $B_{12}$-tannate complex.

In another aspect of this invention, it has been found that the inclusion of this water-insoluble zinc-vitamin $B_{12}$-tannate complex in an aqueous gelatin solution results in an aqueous gelatin suspension thereof which demonstrates upon subcutaneous or intramuscular injection an elevation in the serum vitamin $B_{12}$ level in excess of that obtained with an aqueous suspension of this complex without significantly altering the period of time during which this elevation is obtained. The gelatin employed in this aspect of the invention may be any gelatin suitable for parenteral administration. Although the gelatin may be employed in this aqueous gelatin suspension at any concentration less than 16 percent by weight, it has been found that an aqueous gelatin suspension in which the gelatin concentration is from 0.5 to 6 percent by weight produces the desired physiological effect without rendering the composition so viscous as to be injectible only with difficulty. Especially desirable results are obtained when the water-insoluble zinc-vitamin $B_{12}$-tannate complex is included in an aqueous gelatin solution containing from 1 to 4 percent by weight gelatin.

Although this aqueous suspension of the zinc-vitamin $B_{12}$-tannate complex is substantially resistant to deterioration during prolonged storage, the tannic acid component of this complex is susceptible to oxidation with consequent discoloration of the vitamin $B_{12}$ composition. This tendency for oxidation of the tannic acid component of the complex may be avoided, and stability of the vitamin $B_{12}$ composition during prolonged storage can be substantially assured, in inhibiting oxidation thereof by partial dehydration of the aqueous medium in which the zinc-vitamin $B_{12}$-tannate complex is suspended. The partial dehydration of this aqueous suspension may be accomplished by including in the vitamin $B_{12}$ composition a portion of for example propylene glycol or polyethylene glycol in the amount of approximately 50% by volume. Other substances which have been found to enhance the stability of this vitamin $B_{12}$ composition include carboxymethylcellulose and such reducing agents as cysteine and sodium or potassium citrate.

Also, the zinc-vitamin $B_{12}$-tannate complex of this invention may be obtained in the form of a dry powder which can be reconstituted with an aqueous solution prior to injection. This embodiment may be produced by subjecting to lyophilization under aseptic conditions a sterile aqueous suspension of the zinc-vitamin $B_{12}$-tannate complex. The resulting lyophile product can be reconstituted prior to injection with an aqueous isotonic saline solution or an aqueous gelatin solution to obtain an aqueous suspension of the zinc-vitamin $B_{12}$-tannate complex. The lyophile product demonstrates exceptional stability during an extremely prolonged period of storage, and the inclusion therein of a reducing agent, such as cysteine, and an antibacterial agent, such as parahydroxybenzoic acid, prevents deterioration and permits the reconstitution thereof in an aqueous solution without undesirable lumping or coagulating being produced in the resultant aqueous suspension.

In a further aspect of this invention, there is obtained in forming the water-insoluble zinc-vitamin $B_{12}$-tannate complex with a relatively impure vitamin $B_{12}$ preparation the selective solubilization of the impurities associated with the vitamin $B_{12}$ and consequent purification of the vitamin $B_{12}$ composition. A method by which this purification of a relatively impure vitamin $B_{12}$ preparation may be performed in the course of forming a water-insoluble zinc-vitamin $B_{12}$-tannate complex is described hereinafter in Example X. The crude vitamin $B_{12}$ preparations employed in this purification process may be derived from animal sources, such as liver, and from microbiological sources according to methods well known in the art.

It will be apparent from the foregoing that especial advantages are to be realized in the utilization of this zinc-vitamin $B_{12}$-tannate complex by subcutaneous or intramuscular injection. However, this vitamin $B_{12}$ composition may be orally administered to achieve beneficial results.

The advantages of this invention may be further illustrated by the following specific examples:

Example I

Tannic acid, in the amount of 550 mgs., was dissolved in 50 ml. of distilled water, and the resulting solution was filtered through a sterilizing Selas candle into a sterile vessel. The Selas candle was washed with an additional 12.5 ml. of water.

Crystalline cyanocobalamin, in the amount of 137.5 mgs., was dissolved in 50 ml. of water, and the resulting solution was filtered through the Selas candle into the vessel containing the sterile tannic acid solution. The Selas candle was then washed with an additional 12.5 ml. of water.

Crystalline zinc acetate, in the amount of 1.0 gms., was dissolved in 50 ml. of water, and the resulting solution was filtered through the Selas candle into the vessel containing the sterile mixture of vitamin $B_{12}$ and tannic acid to obtain an aqueous suspension of a zinc-vitamin $B_{12}$-tannate complex. The Selas candle was then washed with an additional 12.5 ml. of water.

Thereafter, an aqueous solution, in the amount of 50 ml., containing 2.25 gms. of sodium chloride, 150 mgs. of cysteine and 1.25 gms. of phenol was filtered through the Selas candle into the vessel containing the sterile aqueous suspension of zinc-vitamin $B_{12}$-tannate complex, such that the volume of suspension in the sterile container was increased to a total volume of 250 ml.

The isotonic suspension of the zinc-vitamin $B_{12}$-tannate complex thereby obtained, while undergoing continuous agitation, was filled aseptically into sterile 5 ml. pharmaceutical vials. The filled vials were aseptically stoppered and sealed.

This vitamin $B_{12}$ composition contained 500 mcg. of vitamin $B_{12}$ per ml.

Example II

The action of the vitamin $B_{12}$ composition obtained according to the method of Example I was compared with that of (1) an aqueous isotonic saline solution of vitamin $B_{12}$ containing 0.5% of phenol and (2) an aqueous suspension of vitamin $B_{12}$-tannate prepared according to the method of Example I except that the addition of the zinc acetate was omitted.

A group of 8 rats was employed to test each of these vitamin $B_{12}$ compositions. Each rat in the respective groups was injected subcutaneously with 1.0 ml. of the appropriate vitamin $B_{12}$ composition, which was equivalent to 500 mcg. of vitamin $B_{12}$. The urine of each group of rats was collected periodically and pooled. Merthiolate was added to the pooled urine to retard bacterial decomposition.

Water was provided to the rats ad libitum throughout the period of these tests. When the urine of the rats was collected on successive days, the rats were allowed food for a period of two hours each day. On the other hand, when the urine was collected on alternate days food was provided ad libitum on such alternate days.

The vitamin $B_{12}$ content of the pooled urine was determined by the chemical assay method of P. J. Van Melle published in the Journal of the American Pharmaceutical Association, January 1956.

The results obtained with the aqueous isotonic saline solution of vitamin $B_{12}$ are presented in the following table, wherein the vitamin $B_{12}$ content of the urine is expressed as the total amount excreted by the group of test rats and as the calculated average value for each rat of the group.

| No. of hours following injection | Total amount of excreted vitamin $B_{12}$ per 8 rats (m. mcg.) | Average amount of vitamin $B_{12}$ excreted per rat (m. mcg.) |
|---|---|---|
| 0-5 | 2,500 | 313 |
| 5-24 | 186 | 23 |
| 24-48 | 39 | 5 |
| 48-72 | 11 | 1.3 |

The following results were obtained with the aqueous suspension of $B_{12}$-tannate, in which the expression of results is similar to that employed in the foregoing table:

| No. of hours following injection | Total amount of excreted vitamin $B_{12}$ per 8 rats (m. mcg.) | Average amount of vitamin $B_{12}$ excreted per rat (m. mcg.) |
|---|---|---|
| 0-6 | 2,670 | 334. |
| 6-24 | 144 | 18. |
| 24-48 | 38 | 5. |
| 48-72 | less than 10 | less than 1. |
| 72-96 | less than 10 | less than 1. |

It can be seen from the foregoing results that the absorption control obtained with the vitamin $B_{12}$-tannate composition is similar to that afforded by the aqueous vitamin $B_{12}$ solution.

The following results were obtained with the zinc-vitamin $B_{12}$-tannate composition obtained according to the method of Example I:

| No. of hours following injection | Total amount of excreted vitamin $B_{12}$ per 8 rats (m. mcg.) | Average amount of vitamin $B_{12}$ excreted per rat (m. mcg.) |
|---|---|---|
| 0-5 | 329 | 41 |
| 5-24 | 48 | .6 |
| 48-72 | 63 | 8 |
| 96-120 | 165 | 21 |
| 144-168 | 119 | 15 |
| 216-240 | 52 | 6.5 |
| 264-268 | 52 | 6.5 |
| 336-360 | 25 | 3.0 |

It can be seen from the foregoing table that absorption control was obtained with the zinc-vitamin $B_{12}$-tannate composition for a period in excess of 15 days, whereas with the vitamin $B_{12}$-tannate and aqueous vitamin $B_{12}$ solution excretion of the vitamin $B_{12}$ was substantially complete after 72 hours. In each of the foregoing experiments the rats excreted no vitamin $B_{12}$ during a 24 hour control period preceding the test situation.

*Example III*

The absorption control afforded by the vitamin $B_{12}$ composition obtained according to Example I was compared in humans with that provided by an aqueous isotonic saline solution of vitamin $B_{12}$. Each of these vitamin $B_{12}$ preparations was tested on a group of five patients. Each patient in the group was injected subcutaneously with 1 ml. of the appropriate vitamin $B_{12}$ preparation, which was equivalent to 500 mcg. of vitamin $B_{12}$. At selected intervals after administration of the vitamin $B_{12}$ preparation the content of vitamin $B_{12}$ in the serum of each patient was determined according to the microbiological assay method of Skeggs et al., 184, 211-221 (1950).

The following results were obtained with the aqueous isotonic saline solution of vitamin $B_{12}$, wherein the vitamin $B_{12}$ content of the serum is expressed in m. mcg. per ml.:

| Patient | Time Interval After Injection (hours) | | | | | |
|---|---|---|---|---|---|---|
| | 0 | 8 | 24 | 72 | 144 | 216 |
| 1 | 367 | 12,000 | 1,793 | 1,588 | 461 | 437 |
| 2 | 233 | 17,000 | 1,647 | 1,426 | 315 | 216 |
| 3 | 338 | 13,530 | 1,598 | 1,397 | 297 | 245 |
| 4 | 484 | 1,880 | 1,665 | 1,554 | 408 | 373 |
| 5 | 496 | 1,850 | 1,711 | 1,502 | 577 | 472 |
| Average | 384 | 17,560 | 1,683 | 1,493 | 412 | 349 |

The following results were obtained with the zinc-vitamin $B_{12}$-tannate composition, wherein the tabulated results are expressed in terms of the serum vitamin $B_{12}$ level in m. mcg. per ml.:

| Patient | Time Interval After Injection (hours) | | | | | |
|---|---|---|---|---|---|---|
| | 0 | 8 | 24 | 72 | 144 | 216 |
| 6 | 472 | 588 | 1,519 | 2,490 | 1,502 | 1,379 |
| 7 | 379 | 461 | 1,426 | 2,513 | 1,426 | 1,367 |
| 8 | 548 | 513 | 1,536 | 2,669 | 1,490 | 1,717 |
| 9 | 466 | 1,119 | 1,542 | 2,513 | 1,548 | 1,449 |
| 10 | 980 | 560 | 1,729 | 2,700 | 1,746 | 1,700 |
| Average | 569 | 648 | 1,550 | 2,517 | 1,542 | 1,522 |

It can be seen from the foregoing that, whereas in the patients treated with the aqueous isotonic saline solution of vitamin $B_{12}$ the serum vitamin $B_{12}$ level returned to the normal value after about 44 hours, the patients treated with the zinc-vitamin $B_{12}$-tannate composition demonstrated an elevated serum vitamin $B_{12}$ level for a period in excess of 216 hours.

*Example IV*

The urinary excretion of vitamin $B_{12}$ for the patients treated according to the method of Example III was determined, and the results are expressed in the following table in terms of mcg. of vitamin $B_{12}$:

| Patient | Time Interval After Injection (hours) | | | | | | |
|---|---|---|---|---|---|---|---|
| | 0 | 6 | 24 | 48 | 72 | 120 | 168 | 216 |
| 1 | | 335.0 | 28.6 | | | | | |
| 2 | | 216.0 | 34.4 | | | | | |
| 3 | | 347.5 | 14.6 | | | | | |
| 4 | | 282.0 | 14.1 | | | | | |
| 5 | | 300.5 | 15.1 | | | | | |
| Average | | 296.2 | 21.36 | | | | | |
| 6 | | | | | | | | |
| 7 | | | | | | | | |
| 8 | | | | | | | | |
| 9 | | | | | | | | |
| 10 | | | | | | | | |

It can be seen from the foregoing, in substantiation of the conclusion expressed in Example III, that whereas absorption control was obtained with the aqueous isotonic saline solution of vitamin $B_{12}$ for a period of about 24 hours, the absorption control afforded by the zinc-vitamin $B_{12}$-tannate composition exceeded 216 hours.

*Example V*

Another series of human patients were treated with an aqueous isotonic saline solution of vitamin $B_{12}$ and the zinc-vitamin $B_{12}$-tannate composition obtained according to the method of Example I in the manner of the experiment outlined in Example III.

The following results were obtained with the aqueous isotonic saline solution of vitamin $B_{12}$, wherein the serum content of vitamin $B_{12}$ is expressed in m. mcg. per ml.:

| Patient | Time Interval After Injection (hours) | | | | | | |
|---|---|---|---|---|---|---|---|
| | 0 | 8 | 24 | 72 | 144 | 216 | 288 |
| 1 | 344 | 5,700 | 2,000 | ------ | 945 | 676 | 519 |
| 2 | 216 | 4,800 | 863 | 536 | 455 | 379 | 315 |
| 3 | 391 | 9,000 | 2,160 | 956 | 863 | 670 | 571 |
| 4 | 297 | 7,800 | 2,900 | 1,280 | 700 | 577 | 385 |
| 5 | 233 | 6,700 | 940 | 566 | 530 | 414 | 373 |
| Average | 296 | 6,800 | 1,773 | 835 | 699 | 543 | 433 |

The following results were obtained with the zinc-vitamin $B_{12}$-tannate composition obtained according to the method of Example I, wherein the serum content of vitamin $B_{12}$ is expressed in m. mcg. per ml.:

| Patient | Time Interval After Injection (hours) | | | | | | |
|---|---|---|---|---|---|---|---|
| | 0 | 8 | 24 | 72 | 144 | 216 | 288 |
| 6 | 869 | 1,970 | 1,560 | 1,569 | 2,070 | 2,740 | 2,157 |
| 7 | 402 | 1,050 | 660 | 1,166 | 1,679 | 1,073 | 758 |
| 8 | 356 | 793 | 530 | 1,154 | 2,087 | 1,020 | 665 |
| 9 | 484 | 1,400 | 822 | 1,290 | 1,180 | 1,560 | 1,000 |
| 10 | 245 | 1,143 | 700 | 566 | 799 | 910 | 805 |
| Average | 471 | 1,271 | 854 | 1,149 | 1,563 | 1,461 | 1,077 |

The foregoing tabulated results show that while the serum content of vitamin $B_{12}$ in the patients treated with the aqueous solution of vitamin $B_{12}$ remained at an elevated level for a period of about 144 hours, the serum content of vitamin $B_{12}$ of those patients treated with the zinc-vitamin $B_{12}$-tannate composition was maintained at a significantly elevated level for a period in excess of 216 hours.

Example VI

The urine of patients treated according to the procedure of Example V was also subjected to vitamin $B_{12}$ determinations in the manner of Example IV.

The results obtained with the patients treated with the aqueous isotonic saline solution of vitamin $B_{12}$ are shown in the following table, wherein the urine content of vitamin $B_{12}$ is expressed in mcg.:

| Patient | Time Interval After Injection (hours) | | | | | | | | |
|---|---|---|---|---|---|---|---|---|---|
| | 0 | 6 | 24 | 72 | 96 | 120 | 144 | 168 | |
| 1 | 18.6 | 780 | 320 | 23 | 53 | | | | |
| 2 | 10.2 | 432 | 400 | 30 | 70 | | | | |
| 3 | 2.5 | 630 | 378 | 65 | 116 | | | | |
| 4 | 0.4 | 405 | 310 | 45 | 56 | | | | |
| 5 | 0.2 | 949 | 290 | 50 | 63 | | | | |
| Average | | | 300 | | 72 | | | | |
| 6 | 0.3 | | | | | 0.5 | .720 | 0.3 | .438 | 0.6 | .426 | | |
| 7 | 1.0 | | | | | 0.35 | .525 | 0.6 | .515 | | | 0.32 | .304 |
| 8 | 0.9 | | | 0.45 | 396 | 0.9 | 1.116 | 0.95 | .646 | 0.8 | 1.390 | 0.16 | .218 |
| 9 | 1.2 | | | | | | | | | | | | |
| 10 | | | | | | | | | | | | | |
| Average | | | | 0.79 | | 0.472 | | 0.320 | | 0.363 | | 0.104 | |

It can be seen from the foregoing results that the urinary excretion of vitamin $B_{12}$ was substantially complete within 24 hours in the patients treated with the aqueous vitamin $B_{12}$ solution, while that of the patients treated with the zinc-vitamin $B_{12}$-tannate composition was at a minimal level even after a period of 168 hours.

Example VII

A sterile dry preparation of the zinc-vitamin $B_{12}$-tannate composition was obtained by the following method:

Aqueous solutions of tannic acid, crystalline cyanocobalamin and zinc acetate were sterile-filtered and combined in a sterile container according to the method of Example I. The sterile aqueous suspension of zinc-vitamin $B_{12}$-tannate thereby obtained had the following composition:

| | | |
|---|---|---|
| Tannic acid | gms | 1.1 |
| Vitamin $B_{12}$ | mg | 275 |
| Zinc acetate | gms | 2.0 |

To this sterile suspension of zinc-vitamin $B_{12}$-tannate there was added a sterile-filtered solution containing 600 mg. of cysteine and 500 mg. of methyl parahydroxybenzoic acid. The resulting suspension was diluted to a final volume of 250 ml. with sterile-filtered water.

This dilute sterile suspension was aseptically filled into pharmaceutical vials adapted for the purpose of lyophilization, in the amount of 2.5 ml. of the suspension per 6 ml. vial. The filled vials were aseptically stoppered and the contents thereof frozen. The vials of frozen material were subjected to a lyophilization operation.

This lyophile zinc-vitamin $B_{12}$-tannate composition thereby obtained can be reconstituted with water or an aqueous isotonic saline solution prior to injection.

This lyophile preparation demonstrates an indefinite shelf life, and therefore is especially suitable for those purposes in which the zinc-vitamin $B_{12}$-tannate composition is stored for a prolonged period of time prior to administration.

Example VIII

The lyophile preparation of Example VII was reconstituted with an aqueous isotonic saline solution containing 1% of partially hydrolyzed pharmaceutical gelatin.

This aqueous gelatin suspension of the zinc-vitamin $B_{12}$-tannate, upon subcutaneous or intramuscular injection, produces an elevation of the serum vitamin $B_{12}$ level in excess of that obtained with an aqueous suspension of the zinc-vitamin $B_{12}$-tannate composition. Also, there is obtained a duration of effect in excess of 216 hours.

Example IX

The degree of elevation of the serum vitamin $B_{12}$ level, and the period of time during which the serum vitamin $B_{12}$ level is maintained at the elevated value, may be controlled by regulating the ratio of tannic acid and zinc to the vitamin $B_{12}$ in the zinc-vitamin $B_{12}$-tannate composition.

If the ratio of vitamin $B_{12}$ to tannic acid and zinc is doubled over the relative values employed in the method of Example I, there is obtained an aqueous suspension of the zinc-vitamin $B_{12}$-tannate complex having the following composition:

| | Mg. |
|---|---|
| Tannic acid | 550 |
| Zinc acetate | 1000 |
| Vitamin $B_{12}$ | 275 |

This modified preparation, upon subcutaneous or intramuscular injection, will demonstrate an elevation in the serum vitamin $B_{12}$ level exceeding that shown in Examples II to VII for the preparation obtained by the method of Example I, while the period of time during which this elevation in the serum vitamin $B_{12}$ level is produced will be correspondingly reduced.

Example X

A relatively crude preparation of vitamin $B_{12}$ can be employed in a method substantially according to that set forth in Example I to achieve a zinc-vitamin $B_{12}$-tannate composition suitable for parenteral administration, wherein purification of the vitamin $B_{12}$ is achieved in the course of forming the insoluble zinc-vitamin $B_{12}$-tannate complex.

In this modified procedure, an aqueous solution of relatively impure vitamin $B_{12}$ is produced, containing 100 mcg. of vitamin $B_{12}$ activity per ml. To this solution is added zinc acetate in such amount as to provide in the resulting solution a zinc ion concentration of 200 mcg. per ml. The pH of this solution is adjusted to 7.5 with sodium hydroxide, and then such solution is filtered to separate the zinc-precipitated impurities from the soluble vitamin $B_{12}$ activity.

To the filtered solution is added tannic acid in an amount such that a maximum of vitamin $B_{12}$ impurities are precipitated while retaining substantially all of the vitamin $B_{12}$ activity in the soluble form. The resulting tannic acid precipitate is separated from the vitamin $B_{12}$ solution by filtration and discarded.

Thereafter, tannic acid is added to the vitamin $B_{12}$-containing filtrate in an amount equivalent to 2 mg. of tannic acid per mg. of vitamin $B_{12}$ therein. Then there is added to the filtrate zinc acetate in such amount as to obtain in the resulting suspension 1 mg. of zinc ion per 2 mg. of tannic acid. The resulting zinc-vitamin $B_{12}$-tannate precipitate is separated from the supernatant liquid by filtration or centrifugation.

The separated zinc-vitamin $B_{12}$-tannate precipitate may be suspended in water and reconstituted as an aqueous solution by acidification with citric or hydrochloric acid. The reconstituted solution may be sterile-filtered, and such sterile solution may be reprecipitated by the addition thereto of a sterile solution of sodium hydroxide or sodium phosphate.

In the alternative, the separated zinc-vitamin $B_{12}$-tannate composition may be mixed with water to form an aqueous suspension thereof and sterilized by autoclaving in the presence of cysteine to obtain a preparation suitable for parenteral administration.

While in the foregoing specification this invention has been described in considerable detail by references to specific embodiments thereof, it will be apparent to those skilled in the art that the invention is susceptible to other embodiments and that many of the details set forth therein can be varied widely without departing from the spirit and concept of the invention.

I claim:

1. An injectible vitamin $B_{12}$ composition, comprising a water-insoluble complex having a vitamin $B_{12}$-active substance component, a zinc component and a tannic acid component.

2. An injectible vitamin $B_{12}$ composition, comprising an aqueous suspension of a water-insoluble complex having a vitamin $B_{12}$-active substance component, a zinc component and a tannic acid component.

3. An injectible vitamin $B_{12}$ composition, comprising an aqueous gelatin suspension of a water-insoluble complex having a vitamin $B_{12}$-active substance component, a zinc component and a tannic acid component.

4. In a method of selectively separating vitamin $B_{12}$ from associated impurities, the steps of combining in an aqueous solution with a crude vitamin $B_{12}$ preparation containing a vitamin $B_{12}$-active substance and associated impurities a water-soluble zinc salt and tannic acid to obtain in the resulting aqueous suspension a water-insoluble complex having a vitamin $B_{12}$-active substance component, a zinc component and a tannic acid component and to selectively solubilize said impurities, and separating said water-insoluble complex from the supernatant liquid.

References Cited in the file of this patent

UNITED STATES PATENTS 2,621,144    Holland    Dec. 9, 1952